(12) United States Patent
Stewart (10) Patent No.: US 10,033,644 B2
(45) Date of Patent: Jul. 24, 2018

(54) CONTROLLING CONGESTION CONTROLLED FLOWS

(71) Applicant: Adara Networks, Inc., San Jose, CA (US)

(72) Inventor: Randall Stewart, Chapin, SC (US)

(73) Assignee: Adara Networks, Inc., San Jose, CA (US)

( * ) Notice: Subject to any disclaimer, the term of this patent is extended or adjusted under 35 U.S.C. 154(b) by 107 days.

(21) Appl. No.: 13/765,611

(22) Filed: Feb. 12, 2013

(65) Prior Publication Data

US 2014/0226475 A1    Aug. 14, 2014

(51) Int. Cl.
| | | |
|---|---|---|
| H04L 12/56 | (2006.01) | |
| H04L 12/801 | (2013.01) | |
| H04L 12/813 | (2013.01) | |
| H04L 12/823 | (2013.01) | |

(52) U.S. Cl.
CPC ............. H04L 47/12 (2013.01); H04L 47/20 (2013.01); H04L 47/19 (2013.01); H04L 47/32 (2013.01)

(58) Field of Classification Search
USPC ................. 370/395.1–395.72, 395.4–395.43
See application file for complete search history.

(56) References Cited

U.S. PATENT DOCUMENTS

| | | | |
|---|---|---|---|
| 5,732,087 A | 3/1998 | Lauer et al. | |
| 6,285,658 B1 | 9/2001 | Packer | |
| 6,889,181 B2 | 5/2005 | Kerr et al. | |
| 6,996,062 B1 | 2/2006 | Freed et al. | |
| 7,106,756 B1 | 9/2006 | Donovan et al. | |
| 7,296,288 B1* | 11/2007 | Hill | H04L 41/0896 713/194 |
| 7,307,999 B1* | 12/2007 | Donaghey | 370/465 |
| 7,447,204 B2 | 11/2008 | Narvaez | |
| 7,453,798 B2* | 11/2008 | Bradford et al. | 370/229 |
| 7,496,661 B1* | 2/2009 | Morford | H04L 41/5025 709/224 |
| 7,512,122 B1 | 3/2009 | Olakangil et al. | |
| 7,774,456 B1 | 8/2010 | Lownsbrough et al. | |
| 7,779,126 B1 | 8/2010 | Cheriton | |
| 7,768,919 B1 | 9/2010 | Conway | |
| 7,945,658 B1 | 5/2011 | Nucci et al. | |
| 8,363,548 B1 | 1/2013 | Aboul-Magd et al. | |
| 8,489,720 B1* | 7/2013 | Morford | H04L 41/0896 709/223 |
| 8,588,056 B1 | 11/2013 | Choi et al. | |
| 8,693,344 B1 | 4/2014 | Adams | |
| 8,959,203 B1* | 2/2015 | Miller et al. | 709/224 |
| 2003/0061263 A1 | 3/2003 | Riddle | |

(Continued)

OTHER PUBLICATIONS

Allman, et al., "TCP Congestion Control," Apr. 1999, RFC 2581, Standards Track, The Internet Society, pp. 1-14.

(Continued)

*Primary Examiner* — Mark Rinehart
*Assistant Examiner* — Peter G Solinsky
(74) *Attorney, Agent, or Firm* — Womble Bond Dickinson (US) LLP (57) ABSTRACT

A flow in a flow set having an access control ("AC") policy assigned is monitored. A bandwidth used by the flow is determined. One or more packets associated with the flow are selectively dropped based on at least one of the used bandwidth and the AC policy.

33 Claims, 7 Drawing Sheets

(56) References Cited

U.S. PATENT DOCUMENTS

| | | |
|---|---|---|
| 2003/0167381 A1 | 9/2003 | Herscovich et al. |
| 2005/0046453 A1* | 3/2005 | H. Jiang .................. 327/156 |
| 2005/0053070 A1 | 3/2005 | Jouppi |
| 2005/0100006 A1* | 5/2005 | Scott et al. .................. 370/360 |
| 2005/0157728 A1 | 7/2005 | Kawano et al. |
| 2005/0182833 A1* | 8/2005 | Duffie et al. .................. 709/224 |
| 2005/0195813 A1 | 9/2005 | Ambe et al. |
| 2006/0075093 A1 | 4/2006 | Frattura et al. |
| 2006/0149845 A1 | 7/2006 | Malin et al. |
| 2006/0159088 A1 | 7/2006 | Aghvami |
| 2006/0159098 A1 | 7/2006 | Munson et al. |
| 2007/0091893 A1 | 4/2007 | Yazaki et al. |
| 2007/0127483 A1 | 6/2007 | Gilon et al. |
| 2007/0147320 A1 | 6/2007 | Sattari et al. |
| 2007/0208854 A1* | 9/2007 | Wiryaman et al. ........... 709/225 |
| 2008/0020775 A1 | 1/2008 | Willars |
| 2008/0056267 A1 | 3/2008 | Hill et al. |
| 2008/0101376 A1 | 5/2008 | Do et al. |
| 2008/0130558 A1 | 6/2008 | Lee et al. |
| 2009/0034428 A1 | 2/2009 | Jeong |
| 2009/0279434 A1* | 11/2009 | Aghvami et al. .............. 370/235 |
| 2009/0323690 A1 | 12/2009 | Lu et al. |
| 2010/0046452 A1 | 2/2010 | Kim et al. |
| 2010/0067380 A1 | 3/2010 | Teng |
| 2010/0098414 A1* | 4/2010 | Kramer et al. .................. 398/45 |
| 2010/0118883 A1 | 5/2010 | Jones et al. |
| 2010/0138919 A1* | 6/2010 | Peng et al. .................. 726/22 |
| 2010/0211637 A1* | 8/2010 | Borzsei et al. ............... 709/204 |
| 2010/0250743 A1 | 9/2010 | Memon et al. |
| 2010/0278189 A1 | 11/2010 | Soon |
| 2010/0325701 A1 | 12/2010 | Sun |
| 2011/0069616 A1* | 3/2011 | Revels .................... H04L 47/10 370/236 |
| 2011/0158095 A1 | 6/2011 | Alexander et al. |
| 2011/0205931 A1 | 8/2011 | Zhou et al. |
| 2011/0222406 A1* | 9/2011 | Persson .................. H04L 47/12 370/236 |
| 2011/0312283 A1* | 12/2011 | Rodbro et al. .................. 455/68 |
| 2011/0321123 A1 | 12/2011 | Ishikawa |
| 2012/0016970 A1 | 1/2012 | Shah et al. |
| 2012/0033553 A1 | 2/2012 | Strulo et al. |
| 2012/0079101 A1* | 3/2012 | Muppala ............. H04L 47/2441 709/224 |
| 2012/0108200 A1* | 5/2012 | Rubin et al. .................. 455/405 |
| 2012/0127859 A1* | 5/2012 | Ko ........................ H04L 47/568 370/232 |
| 2012/0195200 A1* | 8/2012 | Regan ........................ 370/235.1 |
| 2012/0195201 A1* | 8/2012 | Ishikawa .................... 370/235.1 |
| 2012/0311658 A1 | 12/2012 | Dozier |
| 2013/0003554 A1 | 1/2013 | Aybay et al. |
| 2013/0021906 A1 | 1/2013 | Rahman et al. |
| 2013/0058248 A1* | 3/2013 | Singh et al. .................. 370/252 |
| 2013/0064079 A1* | 3/2013 | Zhang .................. H04L 43/026 370/230 |
| 2013/0100955 A1* | 4/2013 | Dunlap .................... H04L 47/20 370/392 |
| 2013/0117766 A1* | 5/2013 | Bax ........................ G06F 13/14 719/323 |
| 2013/0124707 A1 | 5/2013 | Ananthapadmanabha et al. |
| 2013/0132952 A1 | 5/2013 | Shah |
| 2013/0157585 A1* | 6/2013 | Naruszewicz ........ H04W 24/02 455/73 |
| 2013/0159521 A1* | 6/2013 | Marocchi et al. ........... 709/225 |
| 2013/0198794 A1* | 8/2013 | Dharmapurikar ..... G06T 7/0051 725/118 |
| 2013/0204965 A1 | 8/2013 | Masputra |
| 2013/0215754 A1 | 8/2013 | Tripathi et al. |
| 2013/0223438 A1* | 8/2013 | Tripathi et al. ............... 370/355 |
| 2013/0242983 A1 | 9/2013 | Tripathi et al. |
| 2013/0254375 A1* | 9/2013 | Agiwal et al. ................ 709/224 |
| 2013/0279334 A1 | 10/2013 | Xu et al. |
| 2013/0294384 A1* | 11/2013 | Moulsley et al. ............. 370/329 |
| 2013/0301659 A1* | 11/2013 | Schemmann et al. ......... 370/516 |
| 2013/0329747 A1* | 12/2013 | Walid et al. .................. 370/412 |
| 2014/0094159 A1 | 4/2014 | Raleigh et al. |
| 2014/0140213 A1 | 5/2014 | Raleight et al. |
| 2014/0150014 A1 | 5/2014 | Aitken et al. |
| 2014/0156863 A1* | 6/2014 | Gao et al. ..................... 709/231 |
| 2014/0180818 A1* | 6/2014 | Mistler et al. ............. 705/14.57 |
| 2014/0241165 A1 | 8/2014 | Cociglio et al. |
| 2014/0259147 A1* | 9/2014 | L'Heureux et al. ............ 726/14 |
| 2014/0293793 A1* | 10/2014 | Racz et al. .................... 370/235 |
| 2015/0319647 A1 | 11/2015 | Kekki |

OTHER PUBLICATIONS

Floyd, et al., "Random Early Detection (RED) gateways for Congestion Avoidance," Aug. 4, 1993, IEEE/ACM Transactions on Networking 1 (4), pp. 397-413.

Stewart, et al., "Stream Control Transmission Protocol (SCTP): A Reference Guide", Chapter 6, "Congestion Control and Avoidance", Nov. 2, 2001, Addison-Wesley Professional, 8 pages.

\* cited by examiner

| Flow ID | Bandwidth | Priority | Penalty box | Path assignment | AC policy ID |
|---------|-----------|----------|-------------|-----------------|--------------|
| Flow A  | BW1       | N        | N           | P 1             | AC 1         |
| Flow B  | BW2       | N-1      |             | P 2             | AC 2         |
| ...     | ...       | ...      | ...         | ...             | ...          |
| Flow N  | BWn       | 1        | Y           | P n             | AC N         |

CONTROLLING CONGESTION CONTROLLED FLOWS

CROSS-REFERENCE TO RELATED APPLICATION

The present application is related to U.S. patent application Ser. No. 13/765,586, filed on Feb. 12, 2013, entitled "CONTROLLING NON-CONGESTION CONTROLLED FLOWS."

FIELD

Embodiments of the present invention relate to networking, and more particularly, to controlling data flows.

BACKGROUND

A router is a device that forwards data packets between computer networks, creating an overlay internetwork. A data packet is forwarded from one router to another through the networks that constitute the internetwork until it gets to its destination node. Routers on the internet may control traffic. The act of dropping packets to "slow" down flows is called shaping and policing.

Most modern routers use queues to segregate traffic. The router may use upon the queue a number of Advanced Queue Management ("AQM") techniques. One of the existing AQM techniques to control traffic is called a drop tail technique. This technique involves dropping all incoming packets when a queue becomes full. When the packets exit the queue and the queue size lowers, then incoming packets are admitted. Another one of the AQM techniques is called a Random Early Detection ("RED") technique. According to the RED technique, a queue threshold is set at two levels. When the queue reaches the first threshold, the packets are randomly dropped. Once the queue reaches the second threshold then all incoming packets are dropped, as in the drop tail technique.

According to congestion controlled protocols, such as Transmission Control Protocol ("TCP") or Stream Control Transmission Protocol ("SCTP"), when a sender sees drops of packets the sender slows down a packet sending rate. There are different ways according which the sender can slow down the packet sending rate. According to one way, if the sender determines that few packets are missing, the sender performs a fast re-transmit of these packets and reduces the sending rate of the packets to ½ that of what it was previously transmitting at. According to other way, when the sender determines that many packets are missing, the sender takes a timeout and stops sending all packets. After taking the timeout the sender enters a slow start by sending only one packet first, then two packets, and so on to slowly work back up from the full stop timeout.

For the above-mentioned AQM techniques, the routers have no knowledge or awareness of the traffic that they are dropping. There is a random chance of a timeout to occur. For example, if multiple packets are dropped in succession in a congestion controlled flow, such as Transmission Control Protocol ("TCP") flow or Stream Control Transmission Protocol ("SCTP") flow, then the odds increase greatly that the sender will stop sending the packets in the flow altogether and will take a full scale timeout, reverting the flow's congestion window to one Maximum Transmission Unit ("MTU"). Generally, MTU is defined as the size of the largest packet that a network protocol can transmit. The flow then will enter slow-start (as defined by RFC2581 "TCP Congestion Control" document). The full stop of the flow unfairly penalizes and harms the one particular flow while other flows get more bandwidth then the one that took a full stop timeout.

SUMMARY OF THE DESCRIPTION

Exemplary embodiments of methods and apparatuses to control congestion controlled flows are described. For at least some embodiments, a flow in a flow set having an access control ("AC") assigned is monitored. A bandwidth used by the flow is determined. One or more packets associated with the flow are selectively dropped based on at least one of the used bandwidth and the AC policy.

For at least some embodiments, a total bandwidth for the flow set is determined based on the AC policy. A number of flows in the flow set are determined. A bandwidth limit for the flow is determined based on the total bandwidth and the number of flows. The used bandwidth is compared with the bandwidth limit.

For at least some embodiments, the flow is determined as being in a penalty box. At least one of a number of packets in the penalty box, time the packets are in the penalty box, and arrival rate of the packets in the penalty box is determined. For at least some embodiments, the penalty box is a virtual penalty box.

For at least some embodiments, a number of the dropped packets is decreased based on the at least one of the number of packets in the penalty box, time the packets are in the penalty box, and arrival rate of the packets in the penalty box.

For at least some embodiments, a number of the dropped packets is increased based on the at least one of the number of packets in the penalty box, time the packets are in the penalty box, and arrival rate of the packets in the penalty box.

For at least some embodiments, a packet associated with a flow in a penalty box is received. A number of packets in the penalty box are counted. One or more packets are dropped based on the number of packets in the penalty box. The packets in the penalty box are counted at a predetermined time. The number of packets is compared with one or more predetermined thresholds.

Other features of embodiments of the invention will be apparent from the accompanying drawings and from the detailed description which follows.

BRIEF DESCRIPTION OF DRAWINGS

Embodiments of the present invention are illustrated by way of example and not limitation in the figures of the accompanying drawings in which like references indicate similar elements.

DETAILED DESCRIPTION

Exemplary embodiments of methods and apparatuses to control congestion controlled flows are described. For at least some embodiments, a flow in a flow set having an access control ("AC") assigned is monitored. A bandwidth used by the flow is determined. One or more packets associated with the flow are selectively dropped based on at least one of the used bandwidth and the AC policy. Exemplary embodiments described herein provide fairness in dropping of congestion controlled flows.

Exemplary embodiments described herein allow a congestion controlled flow to avoid random time out. For at least some embodiments, packets are dropped in a selective manner to allow a sender to perform a fast-retransmit instead of a timeout.

Figure 1:
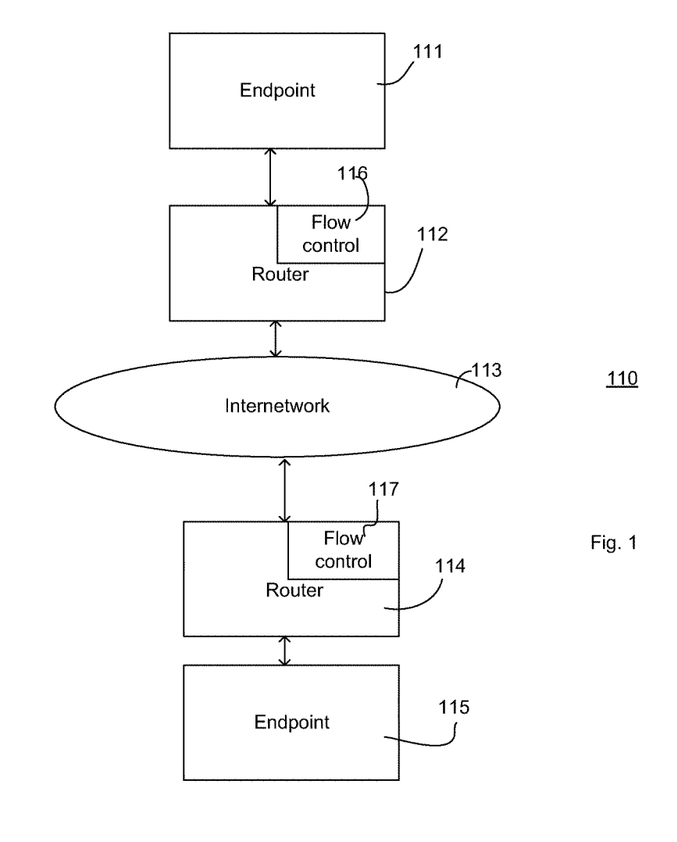
FIG. 1 illustrates an exemplary network to control congestion controlled flows according to one embodiment of the invention.

FIG. 1 illustrates an exemplary network 110 to control congestion controlled flows according to one embodiment of the invention. As shown in FIG. 1, the network 120 includes network devices, e.g., an endpoint device 111 that can act for example as a source device to transmit data, one or more routers (e.g., a router 112 and a router 114) to forward the data along a network path, and an endpoint device 115 that can act for example as a destination device to receive the data. For one embodiment, the network path includes an internetwork (e.g., an internetwork 113) including a plurality of routers that forward data along a plurality of network paths (e.g., the Internet).

For one embodiment, the routers 114 and 112 create an overlay network along the network path. Generally, a router can be connected to data paths from a plurality of networks. Generally, when a data packet comes on a data path, the router reads the address information in the packet to determine its destination. Then, using information from a routing table stored in a memory, the router directs the packet to a next network. Generally, the router can set a policy as to how much bandwidth a given set of traffic is allowed to have. If the traffic presented is over those limits the router begins to drop traffic.

All the routers in the network are interconnected to send packets from one host to another. Typically, a host can be a client or a server depending on what role it is serving. Typically, the routers have their own queues that they run to control traffic flow.

As shown in FIG. 1, routers 114 and 112 have flow control units, such as a flow control unit 116 and a flow control unit 117 to control congestion controlled flows, as described herein.

A flow in a flow set having an assigned access control ("AC") policy is monitored by a flow control unit, such as flow control unit 116, flow control unit 117. The flow control unit determines a bandwidth used by the flow, and selectively drops one or more packets and transmits other packets associated with the flow based on at least one of the used bandwidth and the AC policy, as described in further detail below. For at least some embodiments, the flow is a congestion controlled flow, e.g., a Transmission Control Protocol ("TCP"), a Stream Control Transmission Protocol ("SCTP") flow, or other congestion controlled flow. Typically, a Transmission Control Protocol ("TCP") flow has a defined start and end by the protocol definition. Typically, a User Datagram Protocol ("UDP") flow is defined as a first packet arrives, and the flow end is defined as a time period that elapses with no data exchange on the flow. Typically, a UDP flow is considered a non-congestion controlled flow.

For at least some embodiments, a flow refers to a stream of data packets between two hosts. For at least some embodiments, the flow is defined uniquely by its five-tuple (source IP address, source port, destination IP address, destination port, protocol type TCP/UDP) from the packet header or any combination thereof. For at least some embodiments, the packet information that defines the flow is expanded to include five-tuple (source IP address, source port, destination IP address, destination port, protocol type TCP/UDP) and other information from the packet header (e.g., media access control ("MAC") addresses, a type of service ("TOS") data sometimes called a Differentiated Services Code Point ("DSCP") value, other data, or any combination thereof. For at least some embodiments, the flow is uniquely defined at a given time. For example, two concurrent flows, on the same network, are considered different flows as being defined by different data from the packet header. For one embodiment, the port numbers are used to demultiplex the flows to find the application that has a corresponding port from which to read open. So every time a packet comes in, a network device knows to what flow this packet belongs.

For at least some embodiments, the flows are defined by a packet header information including an internet Protocol ("IP") source address; an IP destination address; a source port address; a destination port address; a Media Access Control ("MAC") source address; a MAC destination address; type of service ("TOS") data sometimes called a Differentiated Services Code Point ("DSCP") value; other packet header data; or any combination thereof. For at least some embodiments, the AC policy includes at least one of a bandwidth allocated for the flow and a priority rank for the flow.

Embodiments described herein allow a congestion controlled flow to slow a packet transmission rate down without forcing the flow into a full stop timeout. This assures fairness amongst the flows.

For one embodiment, the flow control unit, such as flow control unit 116 and flow control unit 117 comprises a memory; and a processing unit coupled to the memory to perform methods as described herein.

Figure 2:
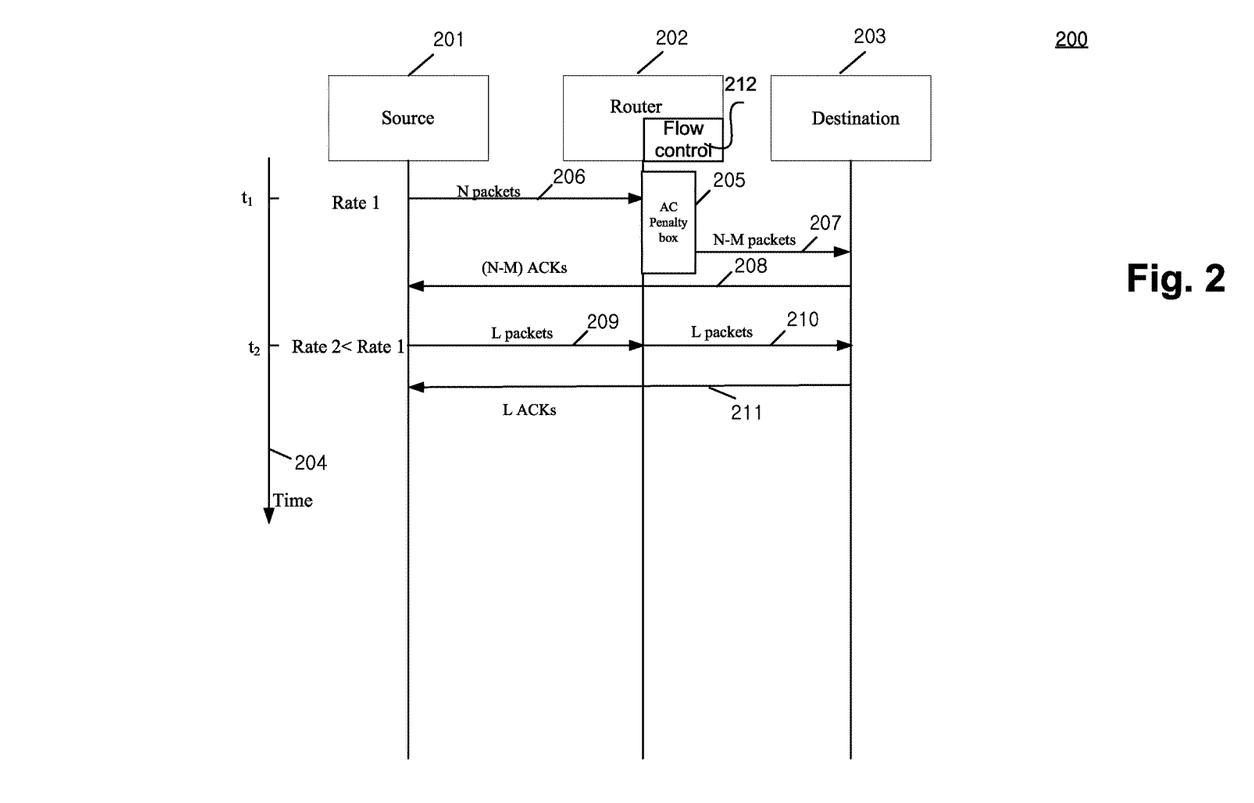
FIG. 2 is a diagram illustrating an exemplary exchange of network packets between endpoints in which a router controls congestion controlled flows according to one embodiment of the invention.

FIG. 2 is a diagram 200 illustrating an exemplary exchange of network packets between endpoints in which a router controls congestion controlled flows according to one embodiment of the invention. As shown in FIG. 2, an endpoint device, such as a source device 201 transmits data packets to a router, such as a router 202. The router 202 has a flow control unit 212 to control congestion controlled flow as described herein. The router forwards the data packets to another endpoint device, such as a destination device 203.

For at least some embodiments, to avoid multiple drops of congestion controlled flow the flow control unit, such as flow control unit 212 performs the following:

1) Each flow of packets, such as a flow 206 is tracked as packets traverse the router in a "session". As shown in FIG. 2, router 202 receives a flow including N packets 206 at a Rate 1 from source device 201 at a time $t_1$ along a timeline 204.

2) As packets traverse the router and the AC policy is exceeded for a given set of flows the flow control unit applies the following heuristic for congestion controlled flows:

a. At the time a packet arrives, e.g., at a time $t_1$ the flow control unit periodically checks the bandwidth usage versus the limits for the flow set (or queue) to which the packet belongs.

b. If the bandwidth usage exceeds the limit, the router calculates for each flow, e.g., for flow 206 in the flow-set its fair share of the bandwidth based on the number of flows and the AC policy.

c. Each congestion-controlled flow, such as flow 206 that is over the policy is placed within a penalty box, such as a penalty box 205. For at least some embodiments, the penalty box is a virtual penalty box.

d. The flows, such as flow 206, remain in the penalty box, such as penalty box 205 until for example, a time $t_2$ when they are back out of the penalty box under the policy. While in the penalty box, each packet allowed forward is tracked. Based on the time the packets are in the penalty box the router uses one or more thresholds to determine whether to drop the packet or not. For example, when the packets first enter the penalty box, every $n^{th}$ packet is dropped, where n is an integer, e.g., 5, or any other integer. If the packets have stayed in the penalty box more than a first threshold, then every $n-1^{th}$ packet is dropped, and so on. If the flow is over a final threshold (e.g., fourth, but it can be any number of thresholds), the flow control unit drops all of the packets in the flow since these packets are not responding to the congestion signals.

As shown in FIG. 2, the flow control unit 212 determines to drop M out of N packets placed in the penalty box 205, and forwards N-M packets 207 to destination device 203. In response to receiving the N-M packets from router 202, destination device 203 transmits (N−M) acknowledgments 208 to source device 201, as shown in FIG. 2.

That is, the flow control unit tracks each individual flow and knows based on measurements of how much bandwidth is available on the flow network paths. The flow control unit determines that there are, for example, 20 TCP flows in a flow set and there is, for example, about 100 megabits bandwidth according to AC policy for that flow set. Based on this information the flow control unit determines that a bandwidth limit for each flow is, for example, about five megabits. Any time a flow gets over its limit, the flow is placed into a penalty box. Any time the flow gets under its limit, the flow is taken out of the penalty box. For congestion controlled flows such as TCP and SCTP flows marked as being placed in the penalty box, the flow control unit starts dropping selected packets, e.g., every fifth packet, or every $n^{th}$ packet, where n-is an integer), and then if the flow control unit determines that a number of the packets are still in the penalty box for a predetermined amount of time (e.g., the arrival rate of the packets is still greater than an allocated limit for the flow), the flow control unit can decide to drop every fourth packet, or every $(n-1)^{th}$ packet, and so on until the number of the packets in the penalty box at the time do not exceed the allowed limit (e.g., the arrival rate of the packets does not exceed an allocated limit for the flow). On the other hand, if while dropping every other packet for a predetermined amount of time, the flow control unit determines that there is still a number of the packets the penalty box that is greater than a predetermined limit (e.g., the arrival rate of the packets still exceeds an allocated limit for the flow), as can be a case for a TCP sender that does not do congestion control, as it supposed to do, the flow control unit can start dropping every packet.

For at least some embodiments, when the flow control unit starts dropping every $n^{th}$ packet, a congestion controlling sender, such as source device 201 sees that drop of packets, for example, through a number of acknowledgements received from the destination, such as destination device 203. The sender reduces a sending rate of the packets from Rate 1 to Rate 2 (e.g., by a half, or any other ratio) and starts transmitting packets at lower Rate 2. For example, Rate 1 can correspond to 9 Megabits bandwidth and Rate 2 can correspond to about 5 Megabits bandwidth. As shown in FIG. 2, L packets transmitted at Rate 2 are received 209 by router 202 at time $t_2$. The flow control unit 212 of router 202 determines that the bandwidth used by the flow at time $t_2$ is below the bandwidth limit for that flow, and takes the flow out of the penalty box 205. The router transmits all L packets to destination device 203. In response to receiving L packets 210, the destination device sends L acknowledgments 211 to source device 201, as shown in FIG. 2.

As known to one of ordinary skill in the art, TCP and SCTP are reliable protocols. Based on the ACKs sent by the destination device, the source determines whether the destination device received the packet or not. In response to receiving a packet, the destination sends an ACK indicating that it received the packet and an indication if there is a missing packet. When the source receives the ACKs indicating that there are missing packets the sender reduces the transmission rate (e.g., in half).

By selectively dropping some packets in the flow while allowing other packets in the flow for transmission, the router causes the source device 201 to perform a fast retransmit instead of a full stop timeout to maintain sending of the packets at a faster rate under the AC policy. That is, by having the router be aware of all the flows and knowing the congestion responses that the congestion controlling source device will make, the router can carefully drop packets in a selective manner, when a flow goes over a predetermined limit, allowing the congestion controlled flow will slowly reduce the sending rate within its targeted bandwidth range without having to do a full timeout retransmission and yet keep all flows in conformance to their available bandwidths. Embodiments described herein allow maintaining sending rates for the congestion control flows at a fast retransmit rate without collapsing the flow down into the full timeout and entering slow start.

Figure 3:
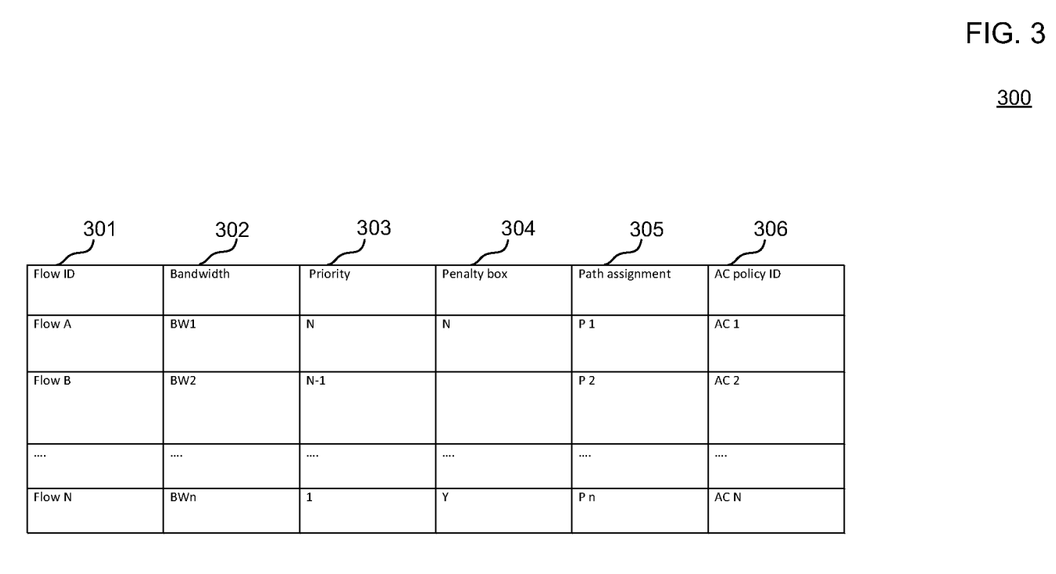
FIG. 3 shows an exemplary data structure stored in a memory containing information about flows received by a network device according to one embodiment of the invention.

FIG. 3 shows an exemplary data structure stored in a memory containing information about congestion controlled flows in a flow set received by a network device according to one embodiment of the invention. The data structure, such as a data structure 300, contains information flows, such as flows A, B, . . . N received by a network device, e.g., a router as depicted in FIGS. 1 and 2. The data structure can have fields, such as fields 301, 302, 303, 304, 305, 306, and other fields. As shown in FIG. 3, a field 301 shows a flow identifier information (Flow ID), and a field 302 shows a bandwidth allocated for the flow. A field 303 shows a priority rank for the flow (1 . . . N). A field 304 indicates whether or not the flow is in a penalty box. A field 305 indicates a path assignment for the flow. For example, the network device can provide multiple paths through the network to get to a destination location. For one embodiment, a mapping policy determines which way we map the flow based on its AC policy. For example, the flow having a high priority can be mapped to a better path than the flow having a lower priority.

For at least some embodiments, a pointer is created to indicate at least one of a path, an AC policy, a priority rank assigned to a flow, and an amount of bytes and packets sent by the flow, a number of times the flow is to be routed, various time statistics as to when the flow was last re-routed, when the flow started, when the flow was put in a penalty box, if the flow is in the box, a number of times the flow has been to the penalty box and a large numbers of statistics, for example, regarding the data that the network device has seen from the flow.

A field 306 shows an AC policy identifier for the flow. For one embodiment, the data structure has a field indicating the last time when a packet is seen on the network device (not shown). For at least some embodiment, the data structure has an out-of-band ("OOB") data field. For one embodiment, during a video call set up, the UDP port numbers which are used to send a video data flow during a video call are identified on a TCP connection, and the AC policy for the video flow is identified based on the UDP port numbers and OOB data. For example, if a UDP port N is identified, and a user's computer is set up to the TCP flow UDP port N, the AC policy is applied to the video flow based on the TCP port N because from the OOB data it is determined that the flow is a video call. For at least some embodiments, the flow set data structure is an ordered list. For at least some embodiments, the flow set data structure is a hash table.

As shown in field 303, a priority rank is assigned to each flow. For example, flow A is assigned a priority rank N higher than a priority rank 1 of flow N. For one embodiment, the priority rank is more important than the arrival time, if the overall bandwidths used by the flows becomes greater than a threshold for a network device. For example, Flow A can get a bandwidth according to the AC policy, and Flow N can be blocked or assigned a different path even though the arrival time t1 of flow A is later than the arrival time tN of Flow N. That is, when there's only a limited bandwidth is available and the AC policy says that one flow has higher priority than other flow, the flow having higher priority gets its bandwidth first and the rest of the bandwidth goes over to the other flow.

For one embodiment the network device uses a data structure, e.g., data structure as shown in FIG. 3 that tracks each flow. For example, when first packets come a session containing a virtual circuit path is created for the flow to track what is going through the network device, e.g., how many bytes it received by the device, how many bytes is going out of the device, and the like.

For one embodiment, if the network device determines that currently only a portion of the available bandwidth is being used, the network device can allow passing more flows through the network device. If the network device determines that all available bandwidth is being used, and the flows have the same priority, the flows that came earlier are provided their bandwidths, and the flows that come later are blocked until the earlier flow is terminated.

Figure 4:
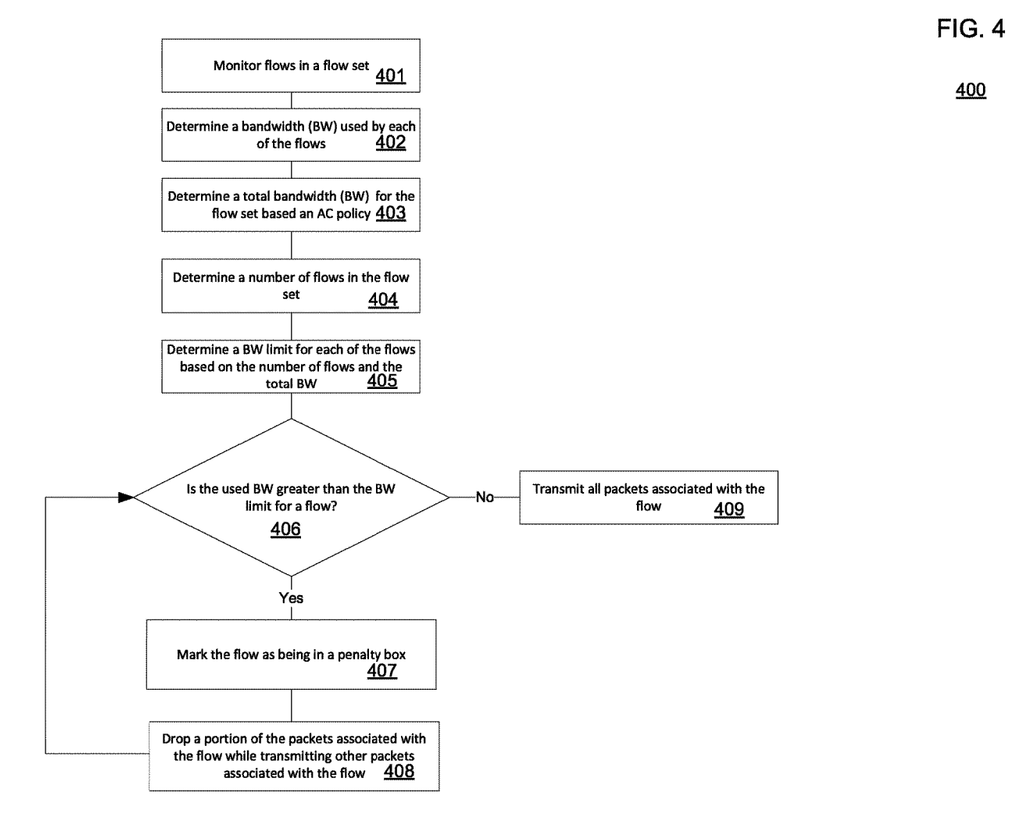
FIG. 4 shows a flow chart of an exemplary method to control congestion controlled flows according to one embodiment of the invention.

FIG. 4 shows a flow chart of an exemplary method 400 to control congestion controlled flows according to one embodiment of the invention. Method 400 begins at block 401 that involves monitoring flows in a flow set. At block 402 a bandwidth ("BW") used by each of the flows is determined. For one embodiment, the BW used by each of the flows is measured by the router. At block 403 a total bandwidth ("total BW") for the flows in the flow set is determined based on an AC policy. At block 404 a number of flows in the flow set is determined. For one embodiment, the number of flows in the flow set is counted. At block 405 a BW limit for each of the flows is determined based on the number of flows and the total BW. For one embodiment, a BW limit is calculated by dividing the total BW allocated for a flow set according to the AC policy by the number of flows in the flow set. For one embodiment, the router dynamically determines how many of congestion controlled flows are active and sending at a current moment and a total bandwidth available for the flows to calculate a target rate for each of the congestion controlled flows. For example, if more bandwidth becomes available (e.g., if the number of active flows decreases), then the target flow rate can go up. If less bandwidth becomes available (e.g., if more flows are added), the target flow rate can go down. Method 400 continues at block 406 where it is determined if the BW used by the flow is greater the flow BW limit. If the used BW is not greater than the BW limit, all packets in the flow are transmitted at block 409. If the used BW is greater than the BW limit, the flow is marked as being in a penalty box at block 407.

At block 408 a portion of the packets in the flow is selectively dropped while other packets in the flow are transmitted, as described herein. Then the method 400 goes back to block 406, as described herein. For at least some embodiments, if the flow slows down and becomes under its target rate, the flow is taken out of the penalty box. The congestion controlled flow typically slows down if the router drops few packets.

For at least some embodiments, the flow control unit, e.g., flow control unit 116, flow control unit 117, and the like, determines a total bandwidth for the flow set based on the AC policy. For at least some embodiments, the flow control unit determines a number of flows in the flow set. For at least some embodiments, the flow control unit determines a bandwidth limit for the flow based on the total bandwidth and the number of flows; and compares the used bandwidth with the bandwidth limit. For at least some embodiments, the flow control unit transmits all packets associated with the flow.

Figure 5:
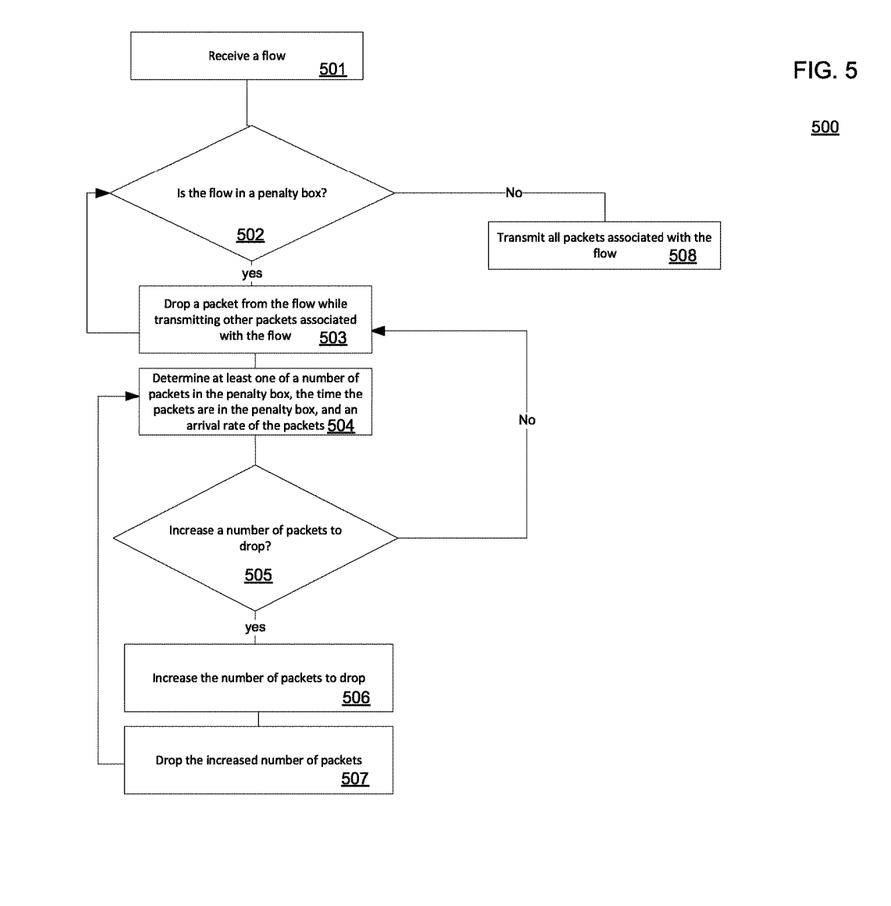
FIG. 5 shows a flow chart of an exemplary method to control congestion controlled flows according to one embodiment of the invention.

FIG. 5 shows a flow chart of an exemplary method 500 to control congestion controlled flows according to one embodiment of the invention. Method 500 begins at block 501 that involves receiving a flow in a flow set. At block 502 it is determined whether the flow is marked as being in a penalty box. If the flow is not in the penalty box, all packets associated with the flow are transmitted at block 508, as described herein. If the flow is marked as being in the penalty box, at block 503 a packet is dropped and discarded from the flow while other packets in the flow are being transmitted, as described herein. For example, every fifth packet, or any other selected packet is dropped, while other packets received into the penalty box are being transmitted, as described herein. At block 504 at least one of a number of packets in the penalty box, the time packets are in the penalty box, and arrival rate of the packets into the penalty box is determined, as described herein. At block 505 a determination is made whether to increase a number of packets for dropping based on at least one of the a number of packets in the penalty box, the time packets are in the penalty box, and arrival rate of the packets into the penalty box. The number of packets to be dropped is increased at block 506. At block 507 the increased number of packets is dropped and discarded. For example, to increase the total number of dropped packets, every $4^{th}$ packet, or any other additional selected packet is being dropped.

For at least some embodiments, the flow control unit, e.g., the flow control unit as depicted in FIG. 1 determines the flow as being in a penalty box. For at least some embodiments, the penalty box is a virtual penalty box. For at least some embodiments, the flow control unit determines at least one of a number of packets in the penalty box, time the packets are in the penalty box, and arrival rate of the packets in the penalty box.

For at least some embodiments, the flow control unit decreases a number of the dropped packets based on the at least one of the number of packets in the penalty box, time the packets are in the penalty box, and arrival rate of the packets in the penalty box. For at least some embodiments, the flow control unit increases a number of the dropped packets based on the at least one of the number of packets in the penalty box, time the packets are in the penalty box, and arrival rate of the packets in the penalty box.

Figure 6:
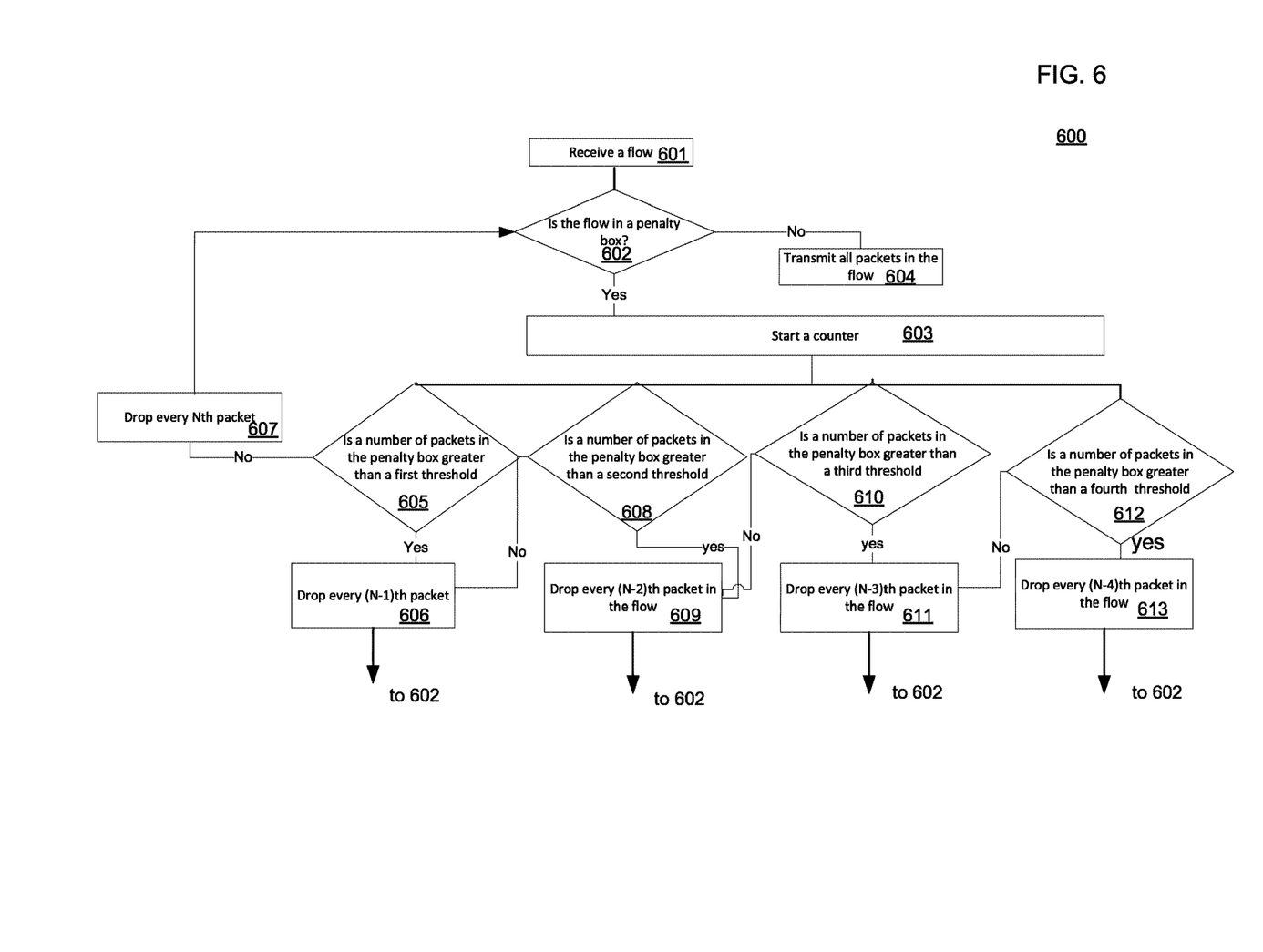
FIG. 6 shows a flow chart of an exemplary method to control congestion controlled flows according to one embodiment of the invention.

FIG. 6 shows a flow chart of an exemplary method 600 to control congestion controlled flows according to one embodiment of the invention. Method 600 begins with block 601 involving receiving a flow in a flow set. At block 602 it is determined whether the flow is marked as being in a penalty box. If the flow is not in the penalty box, all packets in the flow are transmitted at block 604, as described herein. If the flow is marked as being in the penalty box, at block 602 a counter is started to count a number of packets in the penalty box at a current time. At block 605 it is determined if a number of packets in the penalty box greater than a first threshold. If it is determined that the number of packets in the penalty box is not greater than the first threshold, every $n^{th}$ packet in the flow is dropped at block 607. For example, if the number of packets in the flow in the penalty box is not greater than the first threshold, every $5^{th}$ packet in the flow is dropped while allowing other packets to transmit. While doing this, the router keeps a total count of packets that were sent in the penalty box.

If it is determined that the number of packets in the penalty box is greater than the first threshold, every $(n-1)^{th}$ packet in the flow is dropped at block 606, and then method 600 goes back to block 602. At block 608 it is determined if a number of packets in the penalty box greater than a second threshold. If it is determined that the number of packets in the penalty box is not greater than the second threshold, method goes to block 606. If it is determined that the number of packets in the penalty box is greater than the second threshold, every $(n-2)^{th}$ packet in the flow is dropped at block 609, and then method 600 goes back to block 602. At block 610 it is determined if a number of packets in the penalty box greater than a third threshold. If it is determined that the number of packets in the penalty box is not greater than the third threshold, method 600 goes to block 609. If it is determined that the number of packets in the penalty box is greater than the third threshold, every $(n-3)^{th}$ packet in the flow is dropped at block 611, and then method 600 goes back to block 602. At block 612 it is determined if a number of packets in the penalty box greater than a fourth threshold. If it is determined that the number of packets in the penalty box is not greater than the fourth threshold, method 600 goes to block 611. If it is determined that the number of packets in the penalty box is greater than the fourth threshold, every $(n-4)^{th}$ packet in the flow is dropped at block 613, and then method 600 goes back to block 602.

That is, when the count of the packets reaches a certain threshold, the router increases the number of dropped packets. For example, instead of dropping every fifth packet, every fourth packet coming to the penalty box is being dropped. When the flow is placed in the penalty, a counter is started to count the number of packets have gone by in the penalty box. If the flow gets above another threshold, the number of dropped packets is increased. For example, instead of dropping every fourth packet, every third packet coming to the penalty box is being dropped, and so on, all the way up until the sending rate is lowered by the sender. If the sending rate is still not lowered, then every packet is dropped, as for a non-congestion controlled flow.

For at least some embodiments, the thresholds are configurable, and can be any number of packets. For example, the first threshold can be 20 packets, the second threshold can be 40 packets, the third threshold can be 60 packets, and the fourth threshold can be 880 packets. For example, if the router sees that the number of the packets in the flow in the penalty box at a current time is less than 20 packets, every fifth packet in the flow is dropped. If the router sees that the number of the packets in the flow in the penalty box is greater than 20 packets, every fourth packet in the flow is dropped. If the router sees that the number of the packets in the flow in the penalty box is greater than 40 packets, every third packet in the flow is dropped. If the router sees that the number of the packets in the flow in the penalty box is greater than 60 packets, every second packet in the flow is dropped. If the router sees that the number of the packets in the flow in the penalty box is greater than 80 packets, every packet in the flow is dropped. When the bandwidth used by the flow becomes lower than an allowable limit, the counter is cleared, and the flow is taken out of the penalty box. When the flow comes back in the penalty box again, the counter is started again, and the router starts dropping at every fifth packet.

Selective dropping of packets as described herein provides control over the sender's sending rate, prevents any flow in a flow set from being collapsed down into the full stop timeout, and assures that all the flows in the flow set are fair with respect to each other, so that every flow gets a bandwidth according to its AC policy.

For at least some embodiments, the flow control unit, e.g., a flow control unit as depicted in FIGS. 1 and 2 receives a packet associated with a flow in a penalty box. For at least some embodiments, the flow control unit counts a number of packets in the penalty box; and selectively drops one or more first packets based on the number of packets in the penalty box. For at least some embodiments, the packets in the penalty box are counted at a predetermined time.

For at least some embodiments, the flow control unit transmits all packets associated with the flow if the flow is not in a penalty box, as described herein. For at least some embodiments, the flow control unit compares the number of packets with one or more predetermined thresholds. For at least some embodiments, the flow control unit selectively drops one or more second packets based on the number of packets in the penalty box, as described herein. For at least some embodiments, the one or more first packets is every $N^{th}$ packet, $(N-1)^{th}$ packet, every $(N-2)^{th}$ packet, every $(N-K)^{th}$ packet, or any combination thereof, wherein each of N and K is an integer, and wherein K is less than N, as described herein. For at least some embodiments, counting the number of packets in the penalty box includes determining a packet arrival rate into the penalty box, as described herein.

Figure 7:
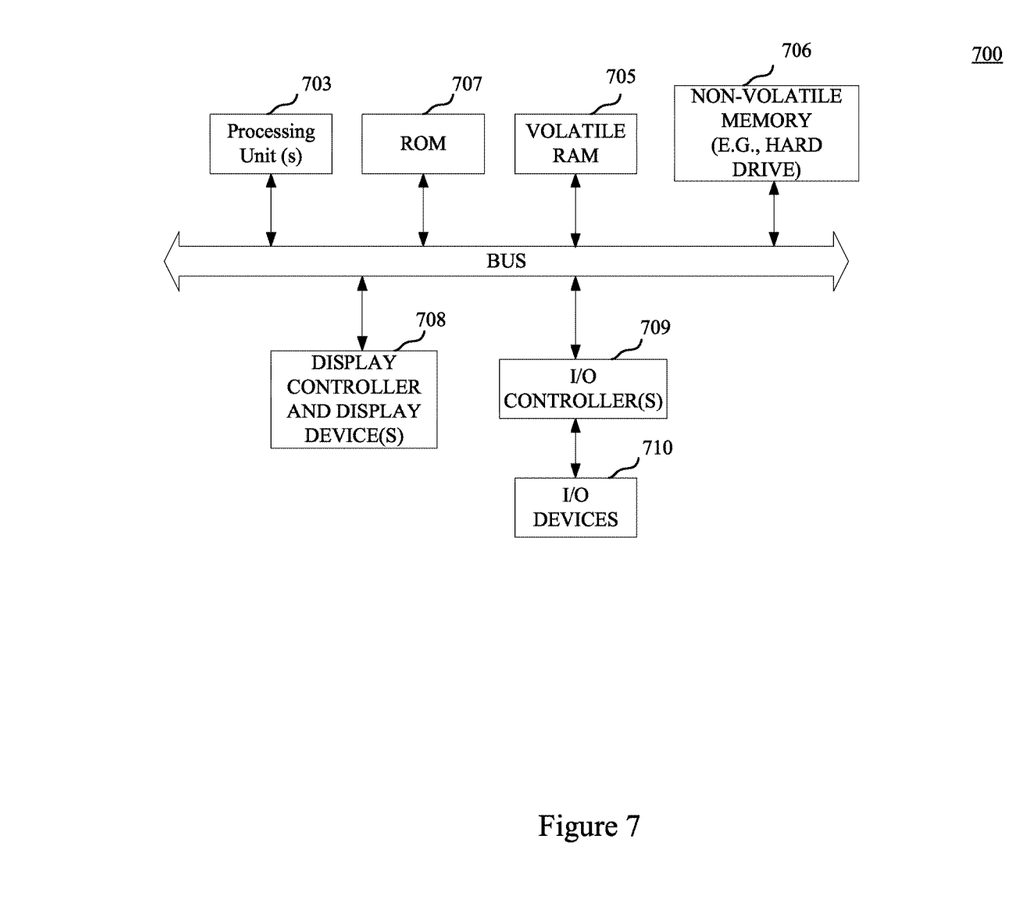
FIG. 7 shows an example of a data processing system to control congestion controlled flows according to one embodiment of the invention.

FIG. 7 shows an example of a data processing system to control congestion controlled flows according to one embodiment of the invention. For one embodiment, the data processing system 700 is a network device that forwards data between endpoint devices, for example, a router, gateway, or a switch. Additional components, not shown, are a part of the data processing system 700. For example, one embodiment of the data processing system 700 includes port adapters or other modular interface controllers that contain circuitry to transmit and receive packets on physical media.

Note that while FIG. 7 illustrates various components of a computer system, it is not intended to represent any particular architecture or manner of interconnecting the components as such details are not germane to the embodiments of the present invention. It will also be appreciated that network computers and other data processing systems which have fewer components or perhaps more components may also be used with the embodiments of the present invention.

Generally, a network refers to a collection of computers and other hardware components interconnected to share resources and information. Networks may be classified according to a wide variety of characteristics, such as the medium used to transport the data, communications protocol used, scale, topology, and organizational scope. Communications protocols define the rules and data formats for exchanging information in a computer network, and provide the basis for network programming. Well-known communications protocols include Ethernet, a hardware and link layer standard that is ubiquitous in local area networks, and the internet protocol ("IP") suite, which defines a set of protocols for internetworking, i.e. for data communication between multiple networks, as well as host-to-host data transfer e.g., Transmission Control Protocol ("TCP"), User Datagram Protocol ("UDP"), and application-specific data transmission formats, for example, Hypertext Transfer Protocol ("HTTP"). Methods and apparatuses described herein can be used for any of networks, protocols, and data formats.

As shown in FIG. 7, the data processing system 700, which is a form of a data processing system, includes a bus 702 which are coupled to one or more processing units 703, a memory including one or more of volatile and non-volatile memories, such as a RAM 705, a ROM 707, a non-volatile memory 706, a solid state disk ("SSD"), Flash, Phase Change Memory ("PCM"), or other types of data storage, and input/output controllers 709.

One or more processing units 703 can include one or more microprocessor(s) and connected system components. For one embodiment, the microprocessor(s) are coupled to separate system components (e.g., multiple connected chips). Alternatively, one or more system components are included with one or more of the microprocessors in a system on a chip.

One or more processing units 703, may include, for example, a G3 or G4 microprocessor from Motorola, Inc. or IBM, may be coupled to a cache memory (not shown) or may include a network processor implemented in a field-programmable gate array ("FPGA"). The memory of the data processing system 700 stores data, metadata, and/or programs for execution by the microprocessor(s). For one embodiment, the memory stores a data structure containing a flow set, e.g., a hash table, a list, or any other data structure, as described in further detail below.

The bus 702 can include one or more buses interconnect various data processing system components together and also connect to a display controller and display device(s) 708 and to input/output ("I/O") devices which may be a mice, keyboards, a modem, I/O interfaces, printers, scanners, video cameras, speakers, and other devices which are well known in the art.

The one or more I/O interfaces are coupled to the bus to allow a user to provide input to, receive output from, and otherwise transfer data to and from the system. The I/O interfaces may also include one or more of an Ethernet port, a fiber optic port, a coaxial cable port, a FireWire port, a Thunderbolt port, a wireless transceiver, etc. to connect the system 700 with another device, an external component, or a network.

Typically, the input/output devices, such as I/O devices 710 are coupled to the system through input/output controllers 709. The volatile RAM 705 is typically implemented as dynamic RAM ("DRAM") which requires power continually in order to refresh or maintain the data in the memory. The non-volatile memory 706 is typically a magnetic hard drive or a magnetic optical drive or an optical drive or a DVD RAM or other type of memory systems which maintain data even after power is removed from the system. Typically, the non-volatile memory will also be a random access memory although this is not required. For at least some embodiments, data processing system 700 includes a power supply (not shown) coupled to the one or more processing units 703 which may include a battery and/or AC power supplies.

While FIG. 7 shows that the non-volatile memory is a local device coupled directly to the rest of the components in the data processing system, it will be appreciated that the embodiments of the present invention may utilize a non-volatile memory which is remote from the system, such as a network storage device which is coupled to the data processing system through a network interface such as a modem or Ethernet interface. The bus 702 may include one or more buses connected to each other through various bridges, controllers and/or adapters as is well known in the art. For one embodiment, the I/O controller 709 includes a Universal Serial Bus ("USB") adapter for controlling USB peripherals, and/or an IEEE-1394 bus adapter for controlling IEEE-1394 peripherals.

It will be apparent from this description that aspects of the present invention may be embodied, at least in part, in software. That is, the techniques may be carried out in a computer system or other data processing system in response to its processor, such as a microprocessor, executing sequences of instructions contained in a memory, such as ROM 707, volatile RAM 705, non-volatile memory 706, or a remote storage device. In various embodiments, hardwired circuitry may be used in combination with software instructions to implement embodiments of the present invention. Thus, the techniques are not limited to any specific combination of hardware circuitry and software nor to any particular source for the instructions executed by the data processing system. In addition, throughout this description, various functions and operations are described as being performed by or caused by software code to simplify description. What is meant by such expressions is that the functions result from execution of the code by one or more processing units 703, e.g., a microprocessor, a field-programmable gate array ("FPGA") and/or a microcontroller.

A non-transitory machine readable medium can be used to store software and data which when executed by a data processing system causes the system to perform embodiments of methods as described herein. This executable software and data may be stored in various places including for example ROM 707, volatile RAM 705, and non-volatile memory 706 as shown in FIG. 7. Portions of this software and/or data may be stored in any one of these storage devices.

Thus, a machine readable medium includes any mechanism that provides (i.e., stores and/or transmits) information in a form accessible by a machine (e.g.; a computer, network device, cellular phone, personal digital assistant, manufacturing tool, any device with a set of one or more processors, etc.). For example, a machine readable medium includes recordable/non-recordable media (e.g., read only memory ("ROM"); random access memory ("RAM"); magnetic disk storage media; optical storage media; flash memory devices; and the like.

The methods of the present invention can be implemented using a dedicated hardware (e.g., using Field Programmable Gate Arrays ("FPGAs"), or Application Specific Integrated Circuit ("ASIC") or shared circuitry (e.g., microprocessors or microcontrollers under control of program instructions stored in a machine readable medium). The methods of the present invention can also be implemented as computer instructions for execution on a data processing system, such as system 700 of FIG. 7. FPGAs typically contain programmable logic components ("logic blocks"), and a hierarchy of reconfigurable interconnects to connect the blocks. In most FPGAs, the logic blocks also include memory elements, which may be simple flip-flops or more complete blocks of memory.

In the foregoing specification, embodiments of the invention have been described with reference to specific exemplary embodiments thereof. It will be evident that various modifications may be made thereto without departing from the broader spirit and scope of the embodiments of the invention. The specification and drawings are, accordingly, to be regarded in an illustrative sense rather than a restrictive sense.

What is claimed is:

1. A machine-implemented method, comprising:
monitoring a flow in a flow set;
determining a first bandwidth used by the flow;
identifying an access control ("AC") policy for the flow;
determining a total bandwidth for the flow set that traverses a router;
counting a number of flows in the flow set;
determining a bandwidth limit for the flow, wherein the bandwidth limit is a share of the total bandwidth that is calculated based on the number of flows and the AC policy;
comparing the first bandwidth with the bandwidth limit;
if the first bandwidth is greater than the bandwidth limit,
dropping every $(N-1)^{th}$ packet of the flow while transmitting other packets of the flow, if a number of packets of the flow in a penalty box is not greater than a predetermined threshold; and
dropping every $(N-2)^{th}$ packet in the flow, wherein N is an integer that is greater than 2, if the number of the packets in the penalty box is greater than the predetermined threshold to prevent a full stop timeout for the flow.

2. The method of claim 1, wherein
the other packets of the flow are transmitted based on the first bandwidth and the bandwidth limit.

3. The method of claim 1, further comprising
determining the flow as being in a penalty box; and
determining at least one of a number of packets in the penalty box, time the packets are in the penalty box, and arrival rate of the packets in the penalty box.

4. The method of claim 3, further comprising
decreasing a number of the dropped packets based on the at least one of the number of packets in the penalty box, time the packets are in the penalty box, and arrival rate of the packets in the penalty box.

5. The method of claim 3, further comprising
increasing a number of the dropped packets based on the at least one of the number of packets in the penalty box, time the packets are in the penalty box, and arrival rate of the packets in the penalty box.

6. A machine-implemented method to control congestion controlled flows, comprising:
determining a total bandwidth for the flow set that traverses a router;
counting a number of flows in the flow set;
identifying a marked flow in the flow set, wherein the flow is marked as being in a penalty box, if a bandwidth used by the flow is greater than a bandwidth limit for the flow, wherein the bandwidth limit is a share of the total bandwidth that is calculated at least based on the number of flows;
counting a number of packets of the marked flow in the penalty box;
comparing the number of the packets with one or more predetermined thresholds;
dropping every $(N-1)^{th}$ packet of the flow, if the number of the packets is not greater than a first threshold; and
dropping every $(N-2)^{th}$ packet in the flow, wherein N is an integer that is greater than 2, if the number of the packets is greater than the first threshold.

7. The method of claim 6, wherein the packets are counted at a predetermined time.

8. The method of claim 6, further comprising
transmitting all packets associated with the flow if the flow is not marked.

9. The method of claim 6, further comprising
dropping every $(N-3)^{th}$ packet in the flow, wherein N is an integer that is greater than 3, if the number of the packets is greater than a second threshold.

10. The method of claim 9, further comprising
dropping every $(N-4)^{th}$ packet in the flow, wherein N is an integer that is greater than 4, if the number of the packets is greater than a fourth third threshold.

11. The method of claim 6, wherein the counting the number of the packets comprises
determining a packet arrival rate into the penalty box.

12. A non-transitory machine readable storage medium that has stored instructions which when executed cause a data processing system to perform operations comprising:
monitoring a flow in a flow set;
determining a first bandwidth used by the flow;
identifying an access control ("AC") policy for the flow;
determining a total bandwidth for the flow set that traverses a router;
counting a number of flows in the flow set;
determining a bandwidth limit for the flow, wherein the bandwidth limit is a share of the total bandwidth that is calculated based on the number of flows and the AC policy;
comparing the first bandwidth with the bandwidth limit;
if the first bandwidth is greater than the bandwidth limit,
dropping every $(N-1)^{th}$ packet of the flow while transmitting other packets of the flow, if a number of packets of the flow in a penalty box is not greater than a predetermined threshold; and
dropping every $(N-2)^{th}$ packet in the flow, wherein N is an integer that is greater than 2, if the number of the packets in the penalty box is greater than the predetermined threshold to prevent a full stop timeout for the flow.

13. The non-transitory machine readable storage medium of claim 12, wherein other packets of the flow are transmitted based on the first bandwidth and the bandwidth limit.

14. The non-transitory machine readable storage medium of claim 12, further comprising instructions which when executed cause the data processing system to perform operations comprising determining at least one of a number of packets in the penalty box, time the packets are in the penalty box, and arrival rate of the packets in the penalty box.

15. The non-transitory machine readable storage medium of claim 14, further comprising instructions which when executed cause the data processing system to perform operations comprising
decreasing a number of the dropped packets based on the at least one of the number of packets in the penalty box, time the packets are in the penalty box, and arrival rate of the packets in the penalty box.

16. The non-transitory machine readable storage medium of claim 14, further comprising instructions which when executed cause the data processing system to perform operations comprising
increasing a number of the dropped packets based on the at least one of the number of packets in the penalty box, time the packets are in the penalty box, and arrival rate of the packets in the penalty box.

17. A non-transitory machine readable storage medium that has stored instructions which when executed cause a data processing system to perform operations to control congestion controlled flows comprising:
determining a total bandwidth for the flow set that traverses a router;
counting a number of flows in the flow set;
identifying a marked flow in the flow set, wherein the flow is marked as being in a penalty box, if a bandwidth used by the flow is greater than a bandwidth limit for the flow, wherein the bandwidth limit is a share of the total bandwidth that is calculated at least based on the number of flows;
counting a number of packets of the marked flow in the penalty box;
comparing the number of the packets with one or more predetermined thresholds; and
dropping every $(N-1)^{th}$ packet of the flow, if the number of the packets is not greater than a first threshold; and
dropping every $(N-2)^{th}$ packet in the flow, wherein N is an integer that is greater than 2, if the number of the packets is greater than the first threshold.

18. The non-transitory machine readable storage medium of claim 17, wherein the packets are counted at a predetermined time.

19. The non-transitory machine readable storage medium of claim 17, further comprising instructions which when executed cause the data processing system to perform operations comprising
transmitting all packets associated with the flow if the flow is not marked.

20. The non-transitory machine readable storage medium of claim 17, further comprising instructions which when executed cause the data processing system to perform operations comprising
dropping every $(N-3)^{th}$ packet in the flow, wherein N is an integer that is greater than 3, if the number of the packets is greater than a second threshold.

21. The non-transitory machine readable storage medium of claim 17, further comprising instructions which when executed cause the data processing system to perform operations comprising dropping every $(N-4)^{th}$ packet in the flow, wherein N is an integer that is greater than 4, if the number of the packets is greater than a third threshold.

22. The non-transitory machine readable storage medium of claim 17, wherein the counting the number of the packets comprises determining a packet arrival rate into the penalty box.

23. An apparatus comprising:
a memory; and
a router comprising a processing unit coupled to the memory, wherein the processing unit is configured to monitor a flow in a flow set; to identify an access control ("AC") policy for the flow; to determine a total bandwidth for the flow set that traverses a router;
to count a number of flows in the flow set, to determine a bandwidth limit for the flow, wherein the bandwidth limit is a share of the total bandwidth that is calculated based on the number of flows and the AC policy; to determine a first bandwidth used by the flow; wherein the processing unit is configured to compare the first bandwidth with the bandwidth limit;
if the first bandwidth is greater than the bandwidth limit, to drop every $(N-1)^{th}$ packet of the flow while transmitting other packets of the flow, if a number of packets of the flow in a penalty box is not greater than a predetermined threshold; and
dropping every $(N-2)^{th}$ packet in the flow, wherein N is an integer that is greater than 2, if the number of the packets in the penalty box is greater than the predetermined threshold to prevent a full stop timeout for the flow.

24. The apparatus of claim 23, wherein the other packets of the flow are transmitted based on the first bandwidth and the bandwidth limit.

25. The apparatus of claim 23, wherein the processing unit is further configured to determine the flow as being in a penalty box; and
to determine at least one of a number of packets in the penalty box, time the packets are in the penalty box, and arrival rate of the packets in the penalty box.

26. The apparatus of claim 25, wherein the processing unit is further configured to decrease a number of the dropped packets based on the at least one of the number of packets in the penalty box, time the packets are in the penalty box, and arrival rate of the packets in the penalty box.

27. The apparatus of claim 25, wherein the processing unit is further configured to increase a number of the dropped packets based on the at least one of the number of packets in the penalty box, time the packets are in the penalty box, and arrival rate of the packets in the penalty box.

28. An apparatus to control congestion controlled flows, comprising:
a memory; and
a processing unit coupled to the memory, wherein the processing unit is configured to determine a total bandwidth for the flow set that traverses a router; to count a number of flows in the flow set; to identify a marked flow in the flow set, wherein the flow is marked as being in a penalty box, if a bandwidth used by the flow is greater than a bandwidth limit for the flow; to count a number of packets of the marked flow in the penalty box, wherein the bandwidth limit is a share of the total bandwidth that is calculated at least based on the number of flows; and to drop every $(N-1)^{th}$ packet of the flow, wherein the processing unit is configured to compare the number of the packets with one or more predetermined thresholds;
if the number of the packets if the number of the packets is not greater than a first threshold; and to drop every $(N-2)^{th}$ packet in the flow, wherein N is an integer that is greater than 2, if the number of the packets is greater than the first threshold.

29. The apparatus of claim 28, wherein the packets are counted at a predetermined time.

30. The apparatus of claim 28, wherein the processing unit is further configured to transmit all packets associated with the flow if the flow is not marked.

31. The apparatus of claim 28, wherein the processing unit is further configured to drop every $(N-3)^{th}$ packet in the flow, wherein N is an integer that is greater than 3, if the number of the packets is greater than a second threshold.

32. The apparatus of claim 31, wherein the processing unit is further configured to drop every $(N-4)^{th}$ packet in the flow, wherein N is an integer that is greater than 4, if the number of the packets is greater than a third threshold.

33. The apparatus of claim 28, wherein the counting the number of the second packets comprises determining a packet arrival rate into the penalty box.

* * * * *